US011673514B2

United States Patent
Fox (10) Patent No.: US 11,673,514 B2
(45) Date of Patent: Jun. 13, 2023

(54) ADJUSTABLE REMOVABLE DEVICE CADDY

(71) Applicant: Desert Fox Golf, LLC, Mesa, AZ (US)

(72) Inventor: Eric Fox, Chandler, AZ (US)

(73) Assignee: Desett Fox Golf, LLC, Mesa, AZ (US)

( * ) Notice: Subject to any disclaimer, the term of this patent is extended or adjusted under 35 U.S.C. 154(b) by 95 days.

(21) Appl. No.: 17/201,171

(22) Filed: Mar. 15, 2021

(65) Prior Publication Data
US 2021/0197732 A1 Jul. 1, 2021

Related U.S. Application Data

(63) Continuation of application No. 16/414,043, filed on May 16, 2019, now Pat. No. 10,974,659.

(60) Provisional application No. 62/672,105, filed on May 16, 2018.

(51) Int. Cl.
*H05K 5/00* (2006.01)
*B60R 11/02* (2006.01)
*B60R 11/00* (2006.01)

(52) U.S. Cl.
CPC ....... *B60R 11/0241* (2013.01); *B60R 11/0217* (2013.01); *B60R 11/0258* (2013.01); *B60R 2011/0003* (2013.01)

(58) Field of Classification Search
CPC ...................................... H05K 5/00
See application file for complete search history.

(56) References Cited

U.S. PATENT DOCUMENTS

2016/0176357 A1* 6/2016 Maslakow ......... F16M 11/2021
29/428

* cited by examiner

*Primary Examiner* — Jerry Wu
(74) *Attorney, Agent, or Firm* — Law Office of Lance C. Venable, PLLC; Lance C. Venable (57) ABSTRACT

An adjustable removable device caddy is disclosed for securing devices including, but not limited to a smartphone or other phone, a tablet, an e-reader, a power bank, a speaker, a multimedia player, a two-way radio, a flashlight or other light, a television or other display, a GPS, a laser range finder, a beverage, or other device. One embodiment of the invention utilizes a combination of one or more seat, wing, and face plate, to create an adjustable cavity that can accommodate a number of devices with varying width and thickness. The adjustable removable device caddy can be mounted to various mounting surfaces including, but not limited to a golf cart, automobile, all-terrain vehicle, maintenance vehicle, boat, pushcart, bicycle, motorcycle, scooter, tent, canopy, flat surface, and the like.

18 Claims, 7 Drawing Sheets

ADJUSTABLE REMOVABLE DEVICE CADDY

CLAIM OF PRIORITY

This application is a continuation of currently pending U.S. patent application Ser. No. 16/414,043 filed on May 16, 2019, which in turn claims the benefit of U.S. Provisional Patent Application Ser. No. 62/672,105.

FIELD OF TECHNOLOGY

The present invention relates generally to holders, caddies, mounts, brackets, and methods of securing devices to various mounting surfaces.

BACKGROUND OF THE INVENTION

There have been other holders, caddies, mounts, brackets, and methods known in the art to secure devices to mounting surfaces. They have been designed in fixed sizes as well as having adjustments, but exhibit a common drawback related to ease of use. The majority are designed to use a clamping force to securely hold a device. These designs prevent the easy insertion and removal of devices. For example, existing caddies, holders, and the like may require the use of two hands to release the clamping force or to simultaneously hold the device while releasing the clamping force.

Fixed size caddies, holders and the like utilize a cavity that may or may not accommodate the device it is intending to hold. The device can move around in a cavity that is too large and does not fit in a cavity that is too small. In many cases, these designs do not secure the device that it is intending to hold unless the device matches the cavity size exactly.

Caddies, holders and the like use bands, clamps, suction cups, adhesive, magnets, and other mechanisms to attach to mounting surfaces. They can leave behind residue, visible marks or require permanent attachment. These designs are often difficult to install and remove when used for temporary mounting.

A popular environment using caddies, holders and the like has been in automobiles with far fewer designs specifically targeting alternative environments. Caddies, holders, and the like can be adapted for use in different environments, but purpose-built versions can address special environmental conditions and use cases.

SUMMARY OF THE INVENTION

The invention is an adjustable removable device caddy, disclosed herein addresses ease of use, durability, portability, and adjustability. The adjustable removable device caddy addresses the need to easily insert and remove a device with one hand and can be manufactured with durable materials that include but are not limited to plastic, metal, wood, and other materials. The adjustable removable device caddy can be installed and removed easily for temporary use but can be permanently installed if desired. According to one embodiment, the adjustable removable device caddy described in this specification can include a base with adjustable wings, face plate, and strap for the purpose of attaching a device to a mounting surface. The device can be any device including but not limited to a smartphone or other phone, a tablet, an e-reader, a power bank, a speaker, a multimedia player, a two-way radio, a flashlight, or other light a television or other display, a GPS, a laser range finder, a beverage, or other device. The adjustable removable device caddy can be mounted to various mounting surfaces including but not limited to a golf cart, automobile, all-terrain vehicle, maintenance vehicle, boat, pushcart, bicycle, motorcycle, scooter, tent, canopy, flat surface, and the like.

One embodiment of an exemplary adjustable removable device caddy includes a base with one or more pad that prevent linear and rotational movement when holding a device. The adjustable removable device caddy utilizes a combination of one or more seat, wing, and face plate, to create an adjustable cavity that can accommodate a number of devices with varying width and thickness. The base has one or more seat oriented in such a way to create a bottom surface that a device will rest on. One or more wing is inserted into the base using a rack (saw tooth rail) and pinion (gear) system to ensure the wings move simultaneously during adjustment. A wing adjustment thumb nut prevents the wings from accidental removal from the base. The wing adjustment thumb nut can be loosened to move the wings and then tightened to prevent further movement. One or more face plate is inserted into the base and secured using the face plate adjustment thumb nut to prevent accidental removal from the base. The face plate adjustment thumb nut can be loosened to move the face plate towards or away from the base and then tightened to prevent further movement.

DETAILED DESCRIPTION OF THE INVENTION

References will be made in detail to one or more embodiments of the adjustable removable device caddy that correspond to one or more examples illustrated by the accompanied drawings.

Use of the word exemplary in this application is intended to present concepts in a concrete fashion. The terminology used herein is used to describe examples only and is not intended to be limiting of examples. As used herein the singular forms "a", "an" and "the" are intended to include the plural forms as well unless the context clearly indicates otherwise. It will be understood that the terms "includes" and/or "including", when used herein spec the presence of stated features, elements and/or components but do not preclude the presence or addition of one or more other features, elements, components and/or groups thereof.

In the following description a plurality of details is set forth to provide a thorough explanation of the embodiments of the present disclosure. However, it will be understood by those of ordinary skill in the art that the example embodiments described herein may be practiced without these special details. In other instances, methods, procedures and components have not been described in detail so as not to obscure the embodiments described herein. In addition, features of the different embodiments described herein may be combined with each other, unless specifically noted otherwise.

Figure 1:
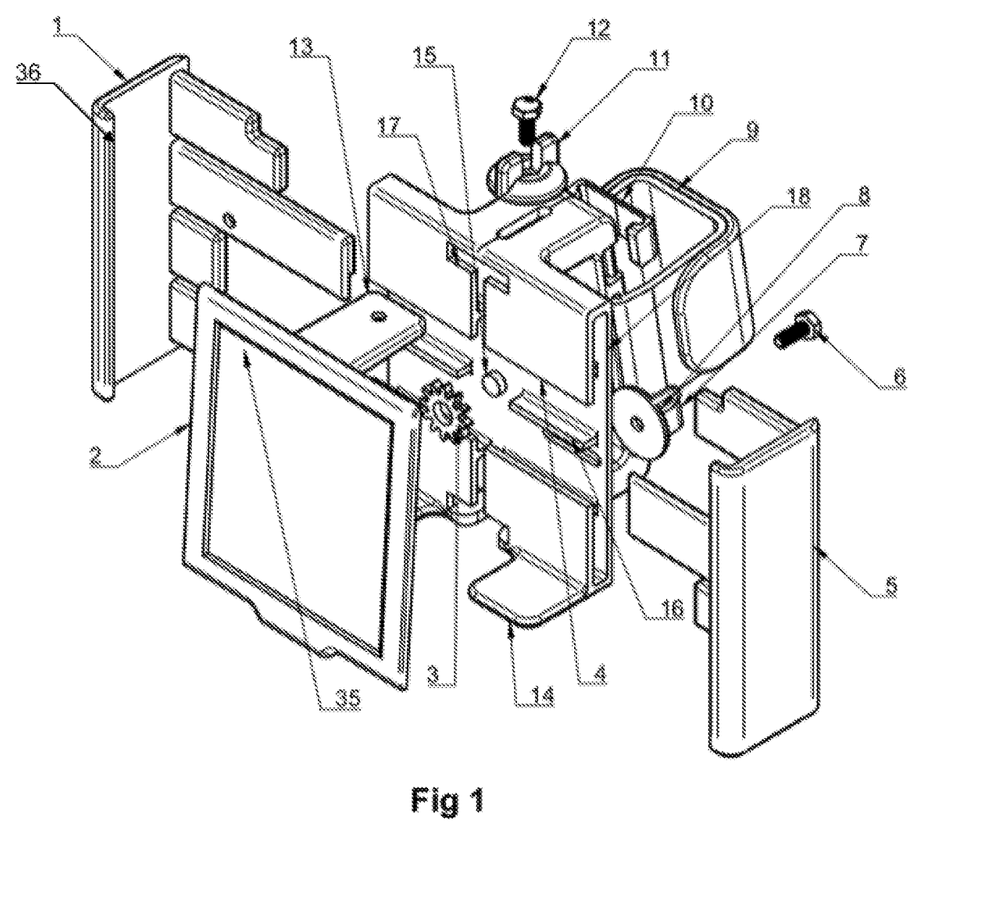
FIG. 1. illustrates an exploded view of an exemplary adjustable removable device caddy.

FIG. 1. illustrates an exploded view of an exemplary adjustable removable device caddy. According to one embodiment, the adjustable removable device caddy includes a base 4 with one or more seat 14, post 15, rib 16 and wing slot 18. It includes a left-wing 1, right-wing 5, face plate 2, face plate adjustment post 13, gear 3, bolts 6 and 12, wing adjustment thumb nut 8, face plate adjustment thumb nut 11, strap 9, and pads 7 and 10. Other embodiments can include one or more wing face plate, strap and pad. The gear 3 is inserted onto the post 15 and fully captured by the left-wing 1 and right-wing 5 once they are inserted into the base 4. The wings, left-wing 1 and right-wing 5, are designed to be inserted into one or more wing slot 18 in the base 4 that are formed from one or more rib 16. The left-wing 1 and right-wing 5 each have a retaining lip 36 to secure an inserted device against the face plate 2. Bolt 6 is inserted through the wing adjustment thumb nut 8 and captured by a nut (not visible) in the back of the right-wing 5 when inserted into the base 4. The face plate 2 and corresponding face plate adjustment post 13 are inserted into the face plate slot 17 in the base 4. The face plate 2 can be configured to accommodate any device including but not limited to a smartphone or other phone, a tablet, an e-reader, a power bank, a speaker, a multimedia player, a two-way radio, a flashlight, or other light a television or other display, a GPS, a laser range finder, a beverage, or other device. This embodiment illustrates an optional face plate frame 35 that creates an offset surface on the face plate 2. Bolt 12 is inserted through the face plate adjustment thumb nut 11 and captured by a nut (not visible) in the face plate adjustment post 13 when inserted into the base 4. The pads 7 and 10 are attached to the base using one or more methods that include but are not limited to glue or over molding process. One or more strap 9 is inserted through the strap slot (not visible) in the base 4.

Figure 2:
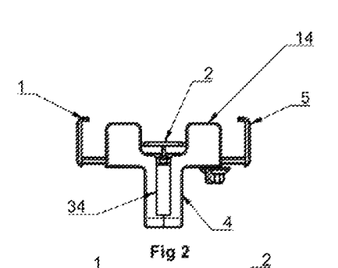
FIG. 2. illustrates the bottom view of an exemplary adjustable removable device caddy.

FIG. 2. Illustrates the bottom view in a multi-view projection of an exemplary adjustable removable device caddy with the left-wing 1, face plate 2, and right-wing 5 in a fully expanded position away tom the base 4. The illustrated embodiment incorporates the seat 14 as part of the base 4 and accessory slot 34. Other embodiments consider elimination of the accessory slot 34, alternate seat 14 locations (not illustrated) that include the face plate 2 and one or both wings, left-wing 1 and right-wing 5.

Figure 3:
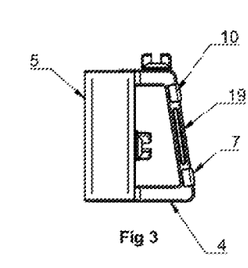
FIG. 3. illustrates the right-side view of an exemplary adjustable removable device caddy.

FIG. 3. Illustrates the right-side view in a multi-view projection of an exemplary adjustable removable device caddy. This view illustrates the right-wing 5 along with pad 10 and pad 7 that prevent linear and/or rotational motion of the adjustable removable device caddy. Pad 10 and pad 7 can be manufactured from a gripping material. Additionally, gripping material can be applied to all or a portion of the back surface 19 of the base 4. Alternatively, the entirety of the base 4 or a portion thereof can be made of a gripping material. The gripping material can be any material that increases the adhesion grip or coefficient of fiction between the base 4, back surface 19, pad 10, and/or pad 7 and mounting surface. The gripping material can include, but is not limited to rubber, polymeric material or other plastic, metal alloy, fabric, composite material, or other material capable of increasing the adhesion grip or coefficient of fiction between surfaces. The gripping material and base 4, back surface 19, pad 10, and/or pad 7 can be textured and composed of the same or different material.

Figure 4:
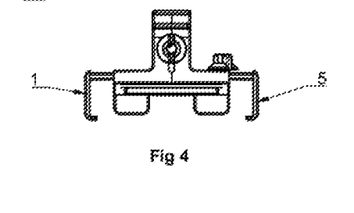
FIG. 4. illustrates the top view of an exemplary adjustable removable device caddy.

FIG. 4. Illustrates the top view in a multi-view projection of an exemplary adjustable removable device caddy.

Figure 5:
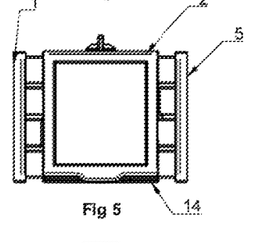
FIG. 5. illustrates the front view of an exemplary adjustable removable device caddy.

FIG. 5. Illustrates the front view in a multi-view projection of an exemplary adjustable removable device caddy.

Figure 6:
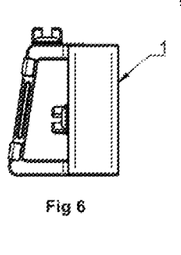
FIG. 6. Illustrates the left-side view of an exemplary adjustable removable device caddy.

FIG. 6. Illustrates the left-side view in a multi-view projection of an exemplary adjustable removable device caddy.

Figure 7:
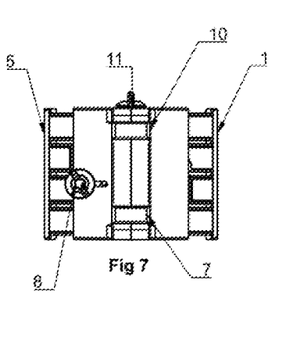
FIG. 7. Illustrates the back view of an exemplary adjustable removable device caddy.

FIG. 7. Illustrates the back view in a multi-view projection of an exemplary adjustable removable device caddy.

Figure 8:
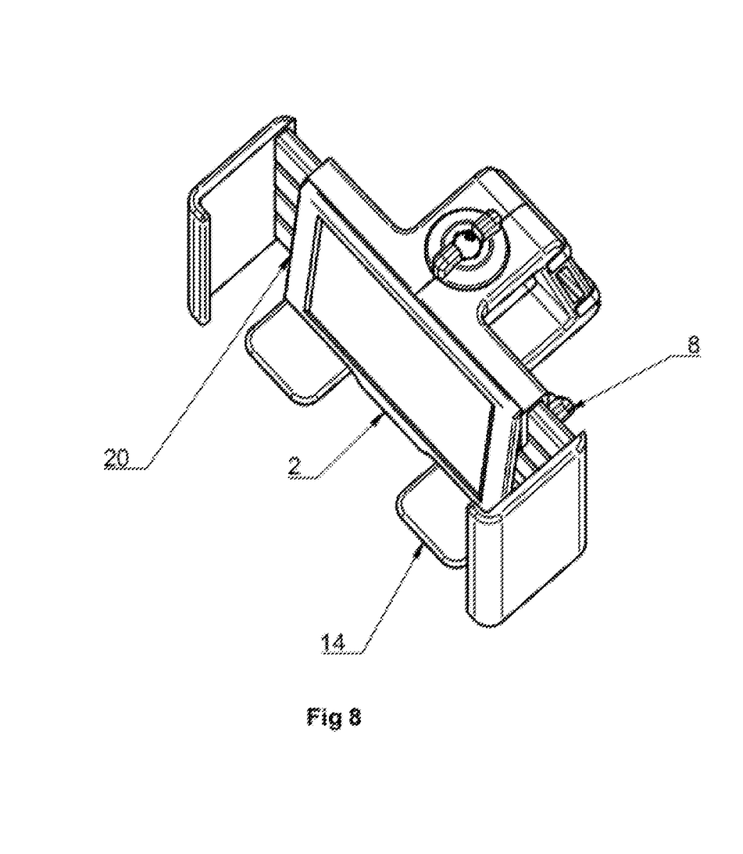
FIG. 8. Illustrates a top-front perspective view of an exemplary adjustable removable device caddy with the wings fully extended away from the base and face plate fully compressed against the base.

FIG. 8. Illustrates a top-front perspective view of an exemplary adjustable removable device caddy. According to one embodiment, this view illustrates the largest device cavity 20 formed between the seat 14, the left-wing 1 and right-wing 5 adjusted to the fully expanded position away from the base 4, and the face plate 2 adjusted to the fully compressed position against the base 4. The wing adjustment thumb nut 8 can be loosened allowing the wings, left-wing 1 and right-wing 5, to move away from the base 4 or closer to the base 4 accommodating a range of device widths. Once the left-wing 1 and right-wing 5 position is adjusted to accommodate a device width the wing adjustment thumb nut 8 can be tightened to secure the wings in a fixed position. The wing adjustment thumb nut 8 prevents both wings, left-wing 1 and right-wing 5, from accidental removal from the base. The face plate adjustment thumb nut 11 can be loosened allowing the face plate 2 to move away from the base 4 or closer to the base 4 accommodating a range of device thicknesses. Once the face plate 2 position is adjusted to accommodate a device thickness, the face plate adjustment thumb nut 11 can be tightened to secure the face plate 2 in a fixed position. The face plate adjustment thumb nut 11 prevents the face plate 2 from accidental removal from the base. The inside surface of the wings, left-wing 1 and right-wing 5, can include a gripping material. The surface of the face plate 2 can include a gripping material. The gripping material can be applied to all or a portion of the wings and/or the face plate 2. Alternatively, the entirety of the wings and/or face plate 2 can be made of a gripping material. The gripping material can be any material that increases the adhesion grip or coefficient of fiction between the wings, face plate 2 and devices inserted into the adjustable removable device caddy. The gripping material can include, but is not limited to rubber, polymeric material or other plastic, metal alloy, fabric, composite material, or other material capable of increasing the adhesion grip or coefficient of friction between surfaces. The gripping material and left-wing 1, right-wing 5, and face plate 2 surfaces can be textured and composed of the same or different material.

Figure 9:
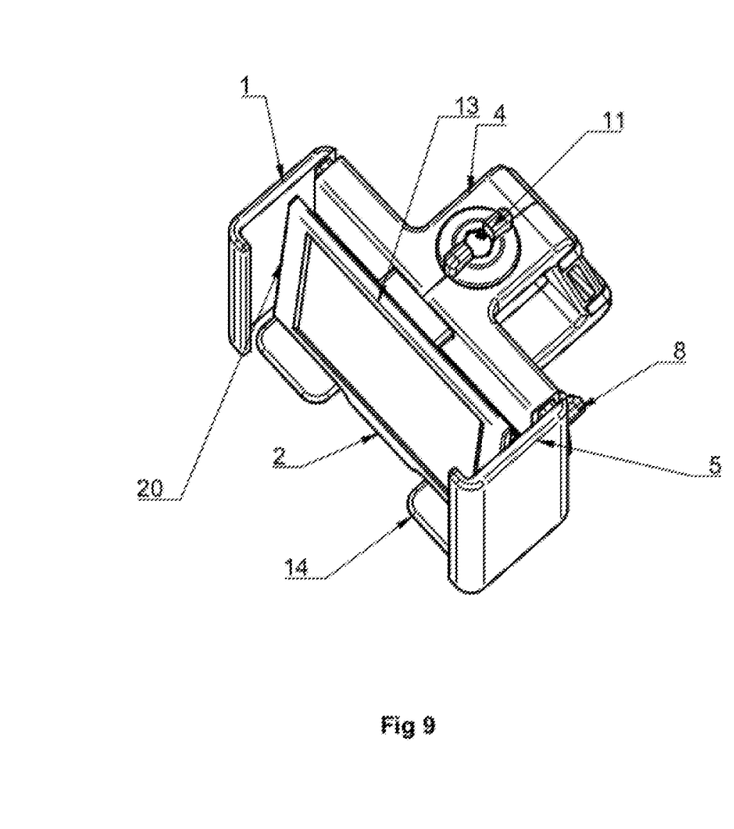
FIG. 9. Illustrates a top-front perspective view of an exemplary adjustable removable device caddy with the wings fully compressed against the base and the face plate fully extended away from the base.

FIG. 9. Illustrates a top-front perspective view of an exemplary adjustable removable device caddy. According to one embodiment, this view illustrates the smallest device cavity 20 formed between the seat 14, the left-wing 1 and right-wing 5 adjusted to the fully compressed position toward the base 4, and the face plate 2 adjusted to the fully expanded position away tom the base 4.

Figure 10:
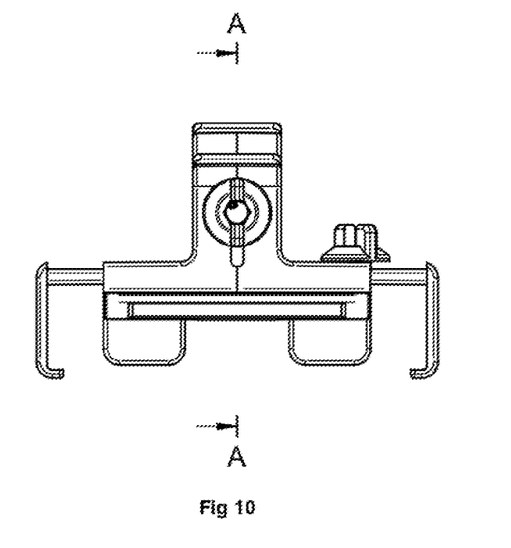
FIG. 10. Illustrates the top view of an exemplary adjustable removable device caddy and the location of the dissection plane used to generate cross-section.
Figure 11:
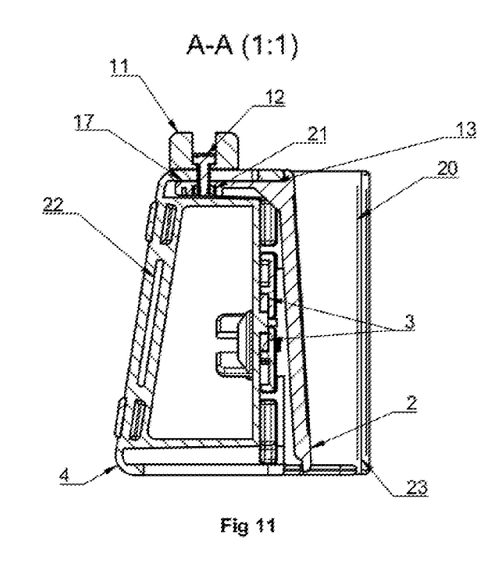
FIG. 11. Illustrates the cross-sectional left-side view of an exemplary adjustable removable device caddy.

FIG. 10. illustrates the top view of an exemplary adjustable removable device caddy and the location of the dissection plane A used to generate the cross-sectional left-side view of the adjustable removable device caddy FIG. 11.

FIG. 11. illustrates the cross-sectional left-side view of an exemplary adjustable removable device caddy. The strap slot 22 extends through the base 4 to allow one or more mounting mechanisms to be used including but not limited to a strap. The face plate adjustment post 13 captures the nut 21 for the bolt 12 inserted through the face plate adjustment thumb nut 11. The face plate adjustment post 13 slides inside of the face plate slot 17 where both are designed to limit side-to-side movement of the face plate 2. The face plate adjustment thumb nut 11 can be loosened allowing the face plate adjustment post 13 and attached face plate 2 to move away from or closer to the base 4 accommodating a range of device thicknesses. Once the face plate 2 position is adjusted to accommodate a device thickness, the face plate adjustment thumb nut 11 and corresponding bolt 12 can be tightened to secure the face plate 2 in a fixed position. Additionally, the face plate adjustment thumb nut 11 prevents the face plate 2 from accidental removal from the base. The face plate 2 is designed and manufactured at an angle extending from the top to the bottom of the face plate 2. One or more angle dimensions can be used to cause the face plate 2 to function as a spring. When a device is inserted into the cavity 20, the face plate 2 spring force pushes the device away from the face plate 2 and towards the wing lip 23 on each wing. The spring force increases friction between the surfaces of the device and the adjustable removable device caddy to help secure the device but maintain the ability to easily remove and insert the device. One embodiment includes a support rib (not visible) built into the back of the face plate 2 to provide rigidity across the face plate 2.

Figure 12:
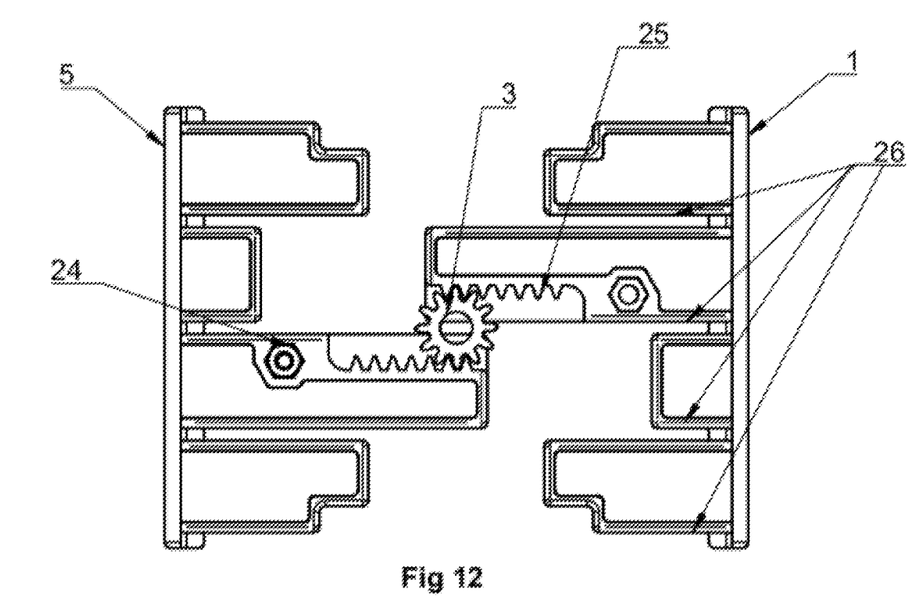
FIG. 12. Illustrates the back view of the left-wing and right-wing rack (saw tooth) and pinion (gear) assembly.

FIG. 12. Illustrates the back view of the left-wing 1 and right-wing 5 rack 25 (saw tooth) and pinion (gear 3) assembly. According to one embodiment of the left-wing 1 and right-wing 5, the wings are identical and assembled with one wing rotated 180 degrees with respect to the other to create a mirror image. The right-wing 5 includes a nut 24 that is used to capture the wing adjustment thumb nut (not visible). The wing rails 26 add support for each wing and capture the gear 3 when inserted into the base (not visible) during assembly. The rack 25 (saw tooth) and pinion (gear 3) mechanism ensures that the left-wing 1 and right-wing 5 move simultaneously when adjusted.

Figure 13:
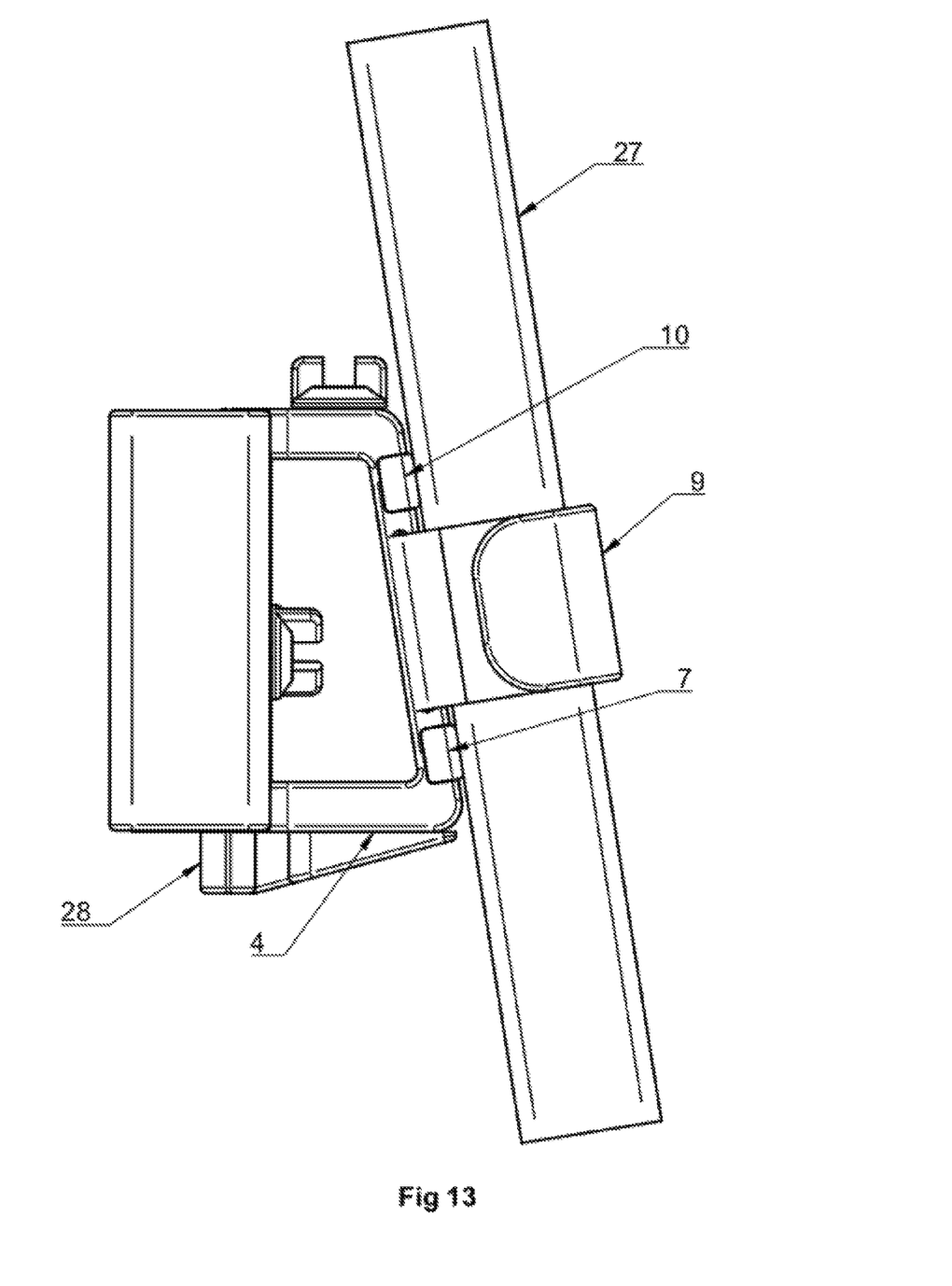
FIG. 13. Illustrates the right-side view of an exemplary mounting environment for an adjustable removable device caddy with optional cord holder.

FIG. 13. illustrates the right-side view of an exemplary mounting environment for an adjustable removable device caddy. According to one embodiment, the adjustable removable device caddy can be attached to a pole 27 using a strap 9 for the purpose of securing devices including but not limited to a smartphone or other phone, a tablet, an e-reader, a power bank, a speaker, a multimedia player, a two-way radio, a flashlight, or other light a television or other display, a GPS, a laser range finder, a beverage or other device. The adjustable removable device caddy can be mounted to various mounting surfaces including but not limited to a golf cart, automobile, all-terrain vehicle, maintenance vehicle, boat, pushcart, bicycle, motorcycle, scooter, tent, canopy, flat surface, and the like. The figure illustrates an optional cord holder 28 that can be inserted into an accessory slot on the bottom of the base 4. The cord holder 28 can slide towards the front and back of the base 4 to accommodate different device power input locations.

Figure 14:
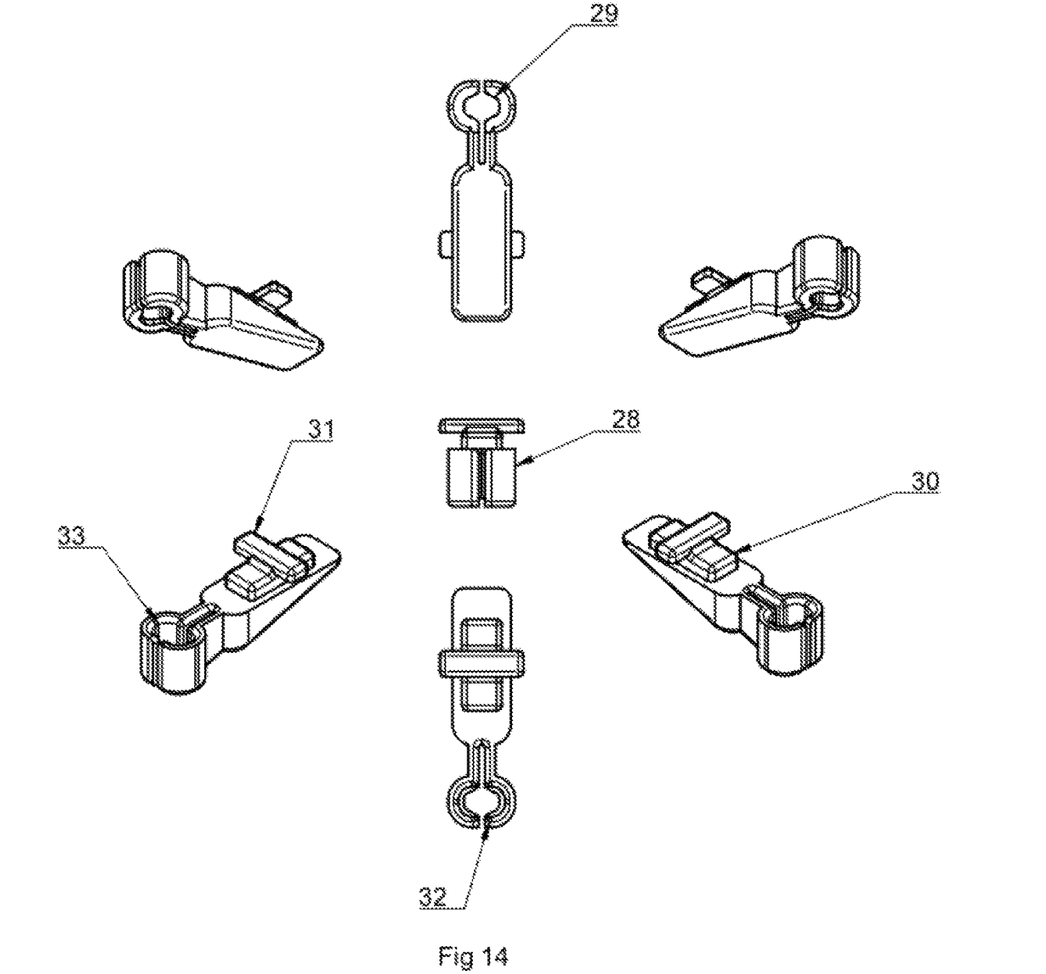
FIG. 14. Illustrates the multi-view projection of the cord.

FIG. 14. illustrates the multi-view projection of the cord holder 28. The cord holder 28 is designed to be inserted and removed from the device caddy accessory slot illustrated in FIG. 2 and considered optional. The cord holder lip 29 is located on the bottom of the cord holder 28 to prevent an inserted cord from corning through the bottom of the cord holder 28. The alignment ridge 30 prevents lateral movement of the cord holder 28 when it is inserted into the device caddy accessory slot illustrated in FIG. 2. The cross bar 31 prevents the cord holder 28 from coming out of the device caddy once it is inserted into the device caddy accessory slot illustrated in FIG. 2. The insert slot 32 is an opening in the front face of the cord holder 28 to allow the insertion of a cord or cable into the cord holder 28. One embodiment of the cord holder 28 includes the cord cavity 33 designed to accommodate a device power cord. The dimensions of the cord cavity 33 are pre-determined based on the type of cord being held.

In the previous description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices, and technologies to which the disclosed embodiments may be applied. The full scope of the invention is not limited to the example(s) that are described below.

What is claimed is:

1. An adjustable removable device caddy comprising: a. a base comprising: i. a top portion comprising a first slot wherein the first slot comprises a first side and second side; ii. a bottom portion comprising a seat wherein the seat extends outward from the base; iii. a middle portion further comprising a rotatable gear; b. a face plate wherein the face plate is adjustable away from or toward the base; c. a first wing and a second wing wherein the first wing and the second wing are: i. adjustably coupled through the first side and second side respectively of the first slot; and ii. coupled to the rotatable gear such that the first wing and second wing are configured to laterally move in sync with each other to secure an inserted device against the face plate.

2. The adjustable removable device caddy of claim 1 wherein the base further comprises a second slot.

3. The adjustable removable device caddy of claim 1 wherein the base further comprises an accessory slot.

4. The adjustable removable device caddy of claim 1 wherein the base further comprises a rib coupled to the middle portion of the base wherein the first wing and second wing and the second wing are slidably coupled to the rib.

5. The adjustable removable device caddy of claim 1 wherein the base further comprises a strap slot.

6. The adjustable removable device caddy of claim 1 further comprising a first securing apparatus wherein the first securing apparatus is coupled to the face plate and is configured to secure the face plate to the base.

7. The adjustable removable device caddy of claim 1 further comprising a second securing apparatus wherein the second securing apparatus is coupled to the first wing and is configured to secure the first wing and the second wing to the base.

8. The adjustable removable device caddy of claim 5 further comprising a strap, wherein the strap is coupled to the strap slot.

9. The adjustable removable device caddy as recited in claim 1, wherein a device cavity is formed by adjustably moving the face plate and the first wing and the second wing.

10. The adjustable removable device caddy as recited in claim 1, wherein the faceplate is configured to accommodate a mobile phone.

11. The adjustable removable device caddy as recited in claim 1, wherein the base further comprises a plurality of pads comprising an anti-slip material secured to the base.

12. The adjustable removable device caddy as recited in claim 1, wherein the first wing and the second wing further comprise a retaining lip.

13. The adjustable removable device caddy as recited in claim 1, wherein the first wing and the second wing further comprise a rack that engages the gear.

14. The adjustable removable device caddy as recited in claim 3, wherein the accessory slot comprises a cord holder that is coupled to the accessory slot.

15. The adjustable removable device caddy as recited in claim 1, wherein the base further comprises an angle offsetting an angled mounting surface to orient the base orthogonally to a horizontal surface.

16. The adjustable removable device caddy as recited in claim 15, wherein the angled mounting surface is a bar on a golf cart.

17. The adjustable removable device caddy as recited in claim 1, wherein the first wing and the second wing are configured to accommodate a mobile phone.

18. The adjustable removable device caddy as recited in claim 2 wherein the face plate further comprises an adjustment post extending outward from a rear side of the face plate wherein the face plate is adjustably coupled to the base by slidably coupling the adjustment post through the second slot.

* * * * *